(12) United States Patent
Viola et al.

(10) Patent No.: US 7,212,651 B2
(45) Date of Patent: May 1, 2007

(54) DETECTING PEDESTRIANS USING PATTERNS OF MOTION AND APPEARANCE IN VIDEOS

(75) Inventors: Paul A. Viola, Kirkland, WA (US); Michael J. Jones, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 713 days.

(21) Appl. No.: 10/463,800

(22) Filed: Jun. 17, 2003

(65) Prior Publication Data

US 2004/0258307 A1    Dec. 23, 2004

(51) Int. Cl.
*G06K 9/00*    (2006.01)

(52) U.S. Cl. .................................................. 382/103

(58) Field of Classification Search ........ 382/100–107, 382/190, 218, 224, 260; 345/155
See application file for complete search history.

(56) References Cited

U.S. PATENT DOCUMENTS

| | | | | |
|---|---|---|---|---|
| 5,150,426 | A * | 9/1992 | Banh et al. ................ | 382/103 |
| 6,035,067 | A * | 3/2000 | Ponticos .................... | 382/226 |
| 6,606,412 | B1 * | 8/2003 | Echigo et al. ............. | 382/224 |
| 6,954,225 | B2 * | 10/2005 | Chen ....................... | 348/207.99 |
| 6,999,604 | B1 * | 2/2006 | Kim et al. ................. | 382/107 |
| 2002/0102024 | A1 * | 8/2002 | Jones et al. ............... | 382/225 |
| 2002/0181785 | A1 * | 12/2002 | Gutta et al. ............... | 382/225 |
| 2003/0194110 | A1 * | 10/2003 | Brodsky .................... | 382/103 |

OTHER PUBLICATIONS

Ken Tabb, "A Hybrid Detection and Classification System for Human Motion Analysis", Department of Computer Science, 2002 University of Hertfordshire, UK. http://www.health.herts.ac.uk/ken/vision/.*
David Casasent, "Detection Filters and Algorithm Fusion for ATR", Image Processing, IEEE Transactions on□□vol. 6, Issue 1, Jan. 1997 pp. 114-125.*
Alejandro Jaimes, "Integrating Multiple Classifiers In Visual Object Detectors Learned From User Input", 4th Asian Conference on Computer Vision (ACCV 2000), Taipei, Taiwan, Jan. 8-11, 2000.*
Haritaoglu et al ; "W4: Real-Time Surveillance of People and Their Activities";IEEE Transactions on Pattern Analysis and Machine Intelligence, vol. 22, No. 8, Aug. 2000.*

(Continued)

*Primary Examiner*—Joseph Mancuso
*Assistant Examiner*—Andrae Allison
(74) *Attorney, Agent, or Firm*—Dirk Brinkman; Clifton D. Mueller; Gene V. Vinokur

(57) ABSTRACT

A method detects a moving object in a temporal sequence of images. Images are selected from the temporally ordered sequence of images. A set of functions is applied to the selected images to generate a set of combined images. A linear combination of filters is applied to a detection window in the set of combined images to determine motion and appearance features of the detection window. The motion and appearance features are summed to determine a cumulative score, which enables a classification of the detection window as including the moving object.

19 Claims, 3 Drawing Sheets

OTHER PUBLICATIONS

Elzein et al; "A Motion and Shape-Based Pedestrian Detection Algorithm"; Intelligent Vehicles Symposium, 2003. Proceedings. IEEE Publication Date: Jun. 9-11, 2003 On pp. 500-504.□□.*

Viola et al., *Rapid Object Detecting Using a Boosted Cascade of Simple Features*, Proceedings 2001 IEEE Conference on Computer Vision and Pattern Recognition, Dec. 8, 2001, vol. 1 of 2, pp. 511-518.

Elzein H, et al., *A Motion and Shape-Based Pedestrian Detection Algorithm*, Intelligent vehicles Symposium 2003 Conference Proceedings, Jun. 9, 2003, pp. 500-504.

Papageogiou C., et al., *A Trainable System for Object Detection*, International Journal of Computer Vision, Kluwer Academic Publishers, Norwell, US, vol. 38, No. 1, 2000, p. 15-33.

Haritaoglu I., et al., "*W4: Real-Time Surveillance of People and Their Activities*," IEEE Transactions on Pattern Analysis and Machine Intelligence, IEEE Inc., NY, US, vol. 22, No. 8, Aug. 2000, pp. 809-830.

Avidan, "Support vector tracking," IEEE Conference on Computer Vision and Pattern Recognition, 2001.

Viola et al., "Rapid object detection using a boosted cascade of simple features," IEEE Conference on Computer Vision and Pattern Recognition, 2001.

Cutler et al., "Robust real-time periodic motion detection: Analysis and applications," IEEE Patt. Anal. Mach. Intell., vol. 22, pp. 781-796, 2000.

Lee, "Gait dynamics for recognition and classification," MIT AI Lab., Memo, AIM-2001-019, MIT, 2001.

\* cited by examiner

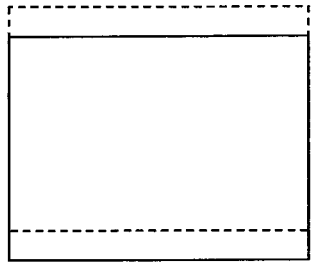
*FIG.3A*
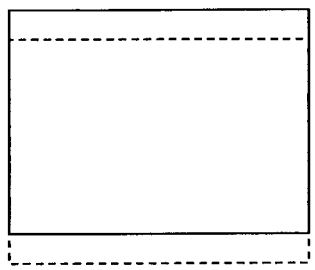
*FIG.3C*
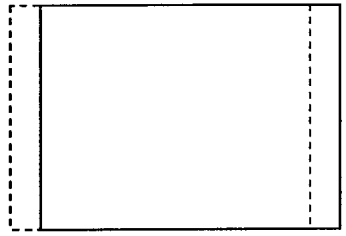
*FIG.3E*
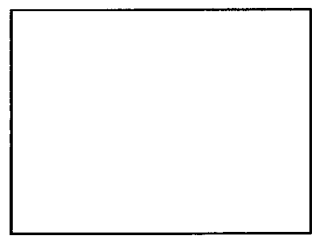
*FIG.3B*
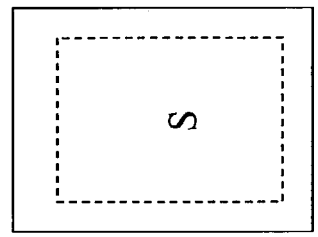
*FIG.3F*
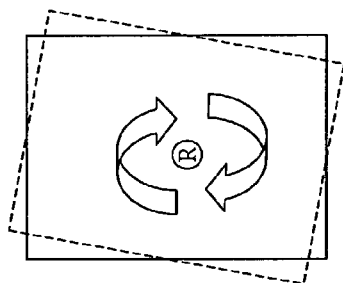
*FIG.3H*
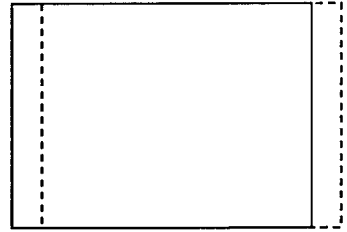
*FIG.3D*
*FIG.3G*

DETECTING PEDESTRIANS USING PATTERNS OF MOTION AND APPEARANCE IN VIDEOS

FIELD OF THE INVENTION

The invention relates generally to computer vision and pattern recognition, and more particularly to detecting moving objects such as pedestrians in videos.

BACKGROUND OF THE INVENTION

For detecting and recognizing objects in images, pattern recognition approaches have achieved measurable success in the domain of computer vision, examples include face, automobile, and pedestrian detection, see e.g., Avidan, "Support vector tracking," IEEE Conference on Computer Vision and Pattern Recognition, 2001, Papageorgiou et al., "A general framework for object detection," International Conference on Computer Vision, 1998, Rowley et al., "Neural network-based face detection," IEEE Patt. Anal. Mach. Intell., Volume 20, pages 22–38, 1998, Schneiderman et al., "A statistical method for 3D object detection applied to faces and cars," International Conference on Computer Vision, 2000, and Viola et al., "Rapid object detection using a boosted cascade of simple features," IEEE Conference on Computer Vision and Pattern Recognition, 2001.

Those approaches generally use machine learning to construct detectors or filters from a large number of training images. The filters are then scanned over an input image in order to find a pattern of features, which is consistent with a target object. Those systems work very well for the detection of faces, but less well for pedestrians, perhaps because the images of pedestrians are more varied, due to changes in body pose and clothing, whereas faces are fairly uniform in texture and structure and with relatively little motion. Therefore, it is desired to provide a method that works on a temporally ordered sequence of images, as well as on a single static image.

The detection of pedestrians is made even more difficult in surveillance applications, where the resolution of the images is relatively low, e.g., the target object may only be a total of about 100–200 pixels, e.g., 5 by 20 or 10 by 20 pixels. Though improvement of pedestrian detection using better functions of image intensity is a valuable pursuit, a new solution is required.

It is well known that patterns of human motion, particularly the pendulum like motion of walking, is distinguishable from other sorts of motion, and that motion can be used to recognize and detect people, see Cutler et al., "Robust real-time periodic motion detection: Analysis and applications," IEEE Patt. Anal. Mach. Intell., Volume 22, pages 781–796, 2000, Lee, "Gait dynamics for recognition and classification," MIT AI Lab., Memo, AIM-2001-019, MIT, 2001, Liu et al., "Finding periodicity in space and time," IEEE International Conference on Computer Vision, pages 376–383, 1998, and Polana et al., "Detecting activities," Journal of Visual Communication and Image Representation, June 1994.

In contrast with the intensity-based approaches, they typically try to track moving objects over many frames, and then analyze the motion to look for periodicity or other cues. Processes that detect motion 'styles' are quite efficient, and it is possible to conduct an exhaustive search over entire images at multiple scales of resolution. When trained with a large data set of images, they can achieve high detection rates and very low false positive rates.

The field of human motion analysis is quite broad and has a history stretching back to the work of Hoffman et al., "The interpretation of biological motion," *Biological Cybernetics*, pages 195–204, 1982. Most of the prior art systems presume that half the problem has already been solved, i.e., a particular type of moving object, for example, a person, has been detected, and that the only remaining problem is to recognize, categorize, or analyze the long-term pattern of motion of that specific moving object.

Recently, interest in motion-based methods has increased because of the possible application of those methods to problems in surveillance. An excellent overview of related work in this area is described by Cutler et al., above. They describe a system that works directly on images. Their system first performs object segmentation and tracking. The objects are aligned to the object's centroids. A 2D lattice is then constructed, to which period analysis is applied.

The field of object detection is equally broad, although systems that perform direct pedestrians detection, using both intensity and motion information at the same time, are not known. Pedestrians have been detected in a static intensity image by first extracting edges and then matching edges with a set of examples, see Gavrila et al, "Real-time object detection for "smart" vehicles," IEEE International Conference on Computer Vision, pages 87–93, 1999. Their system is a highly optimized, and appears to have been a candidate for inclusion in automobiles. Nevertheless published detection rates were approximately 75%, with a false positive rate of 2 per image. Other related work includes that of Papageorgiou et. al, above. That system detects pedestrians using a support vector machine trained on an overcomplete wavelet basis. Based on the published experimental data, their false positive rate is significantly higher than for the related face detection systems.

Therefore, it is desired to extract directly short term patterns of motion and appearance information, from a temporal sequence of images in order to detect instances of a moving object, such as pedestrians.

SUMMARY OF THE INVENTION

The invention provides a system for detecting specific types of moving objects by concurrently integrating image intensity and motion information. A set of filters is scanned over a set of combined images. For example, the filters are rectangular, and the combined images are obtained by applying functions to consecutive images in the video. The scanning of the filters produces feature values. The features are summed and classified.

A classifier is trained to take advantage of both motion and appearance information of a particular type of object, such as a pedestrian. Some past approaches have built detectors based on motion information. Other detectors are based on appearance information. However, the invention integrates both motion and appearance information in a single detector.

BRIEF DESCRIPTION OF THE DRAWINGS

FIGS. 3A–3H are block diagrams of combined images used by the invention.

DETAILED DESCRIPTION OF THE PREFERRED EMBODIMENT

Figure 1:
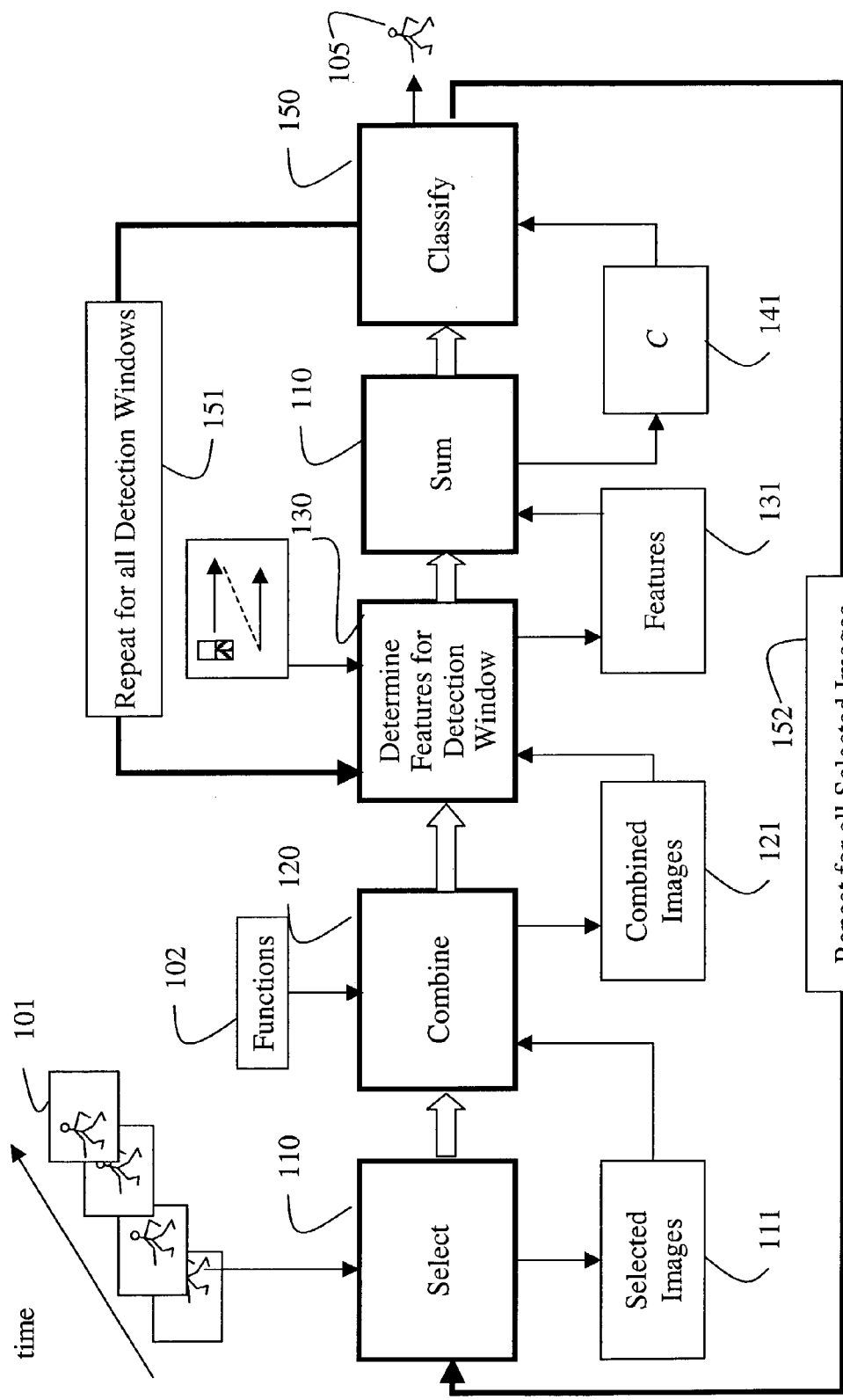
FIG. 1 is a flow diagram of a method for detecting moving objects according to the invention.

FIG. 1 shows a method 100 for detecting a moving object 105, e.g. a pedestrian, in a temporally ordered sequence of images 101, i.e., a video. Selected images 111 are obtained 110 from the input video 101, e.g. adjacent pairs, overlapping pairs, every third image, etc. Functions 102 are applied 120 to the selected images 111 to produce sets of combined images 121. The combined images are partitioned into detection windows or "patches" of various sizes, for example, the entire image, four windows, each ¼ of the image, and so forth. Filters 200 are scanned and evaluated over the detection windows of the sets of combined images to determine 130 features 131, which are summed 140 into cumulative scores C 141. The cumulative scores are classified 150 to determine whether, indeed, a specific detection window includes a particular type of moving object, for example, a pedestrian 105. This is repeated 151 for all detection windows, for all combined images, and then repeated 152 for all images in the video 101.

Filters, Features, and Classifiers

As shown in FIGS. 2A–2F, our dynamic pedestrian detector uses rectangle filters 200 as described by in U.S. patent application Ser. No. 10/200,726, "Object Recognition System," filed by Viola et al., on Jul. 22, 2002, incorporated herein by reference.

Figure 2D:
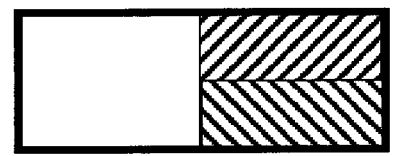
FIGS. 2A–2F are block diagrams of rectangle filters used by the invention.
Figure 2C:
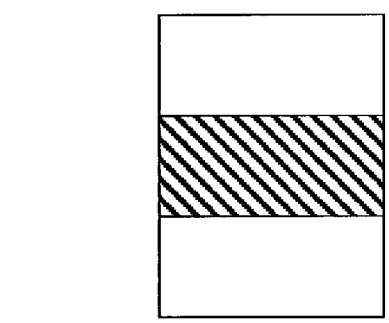
Figure 2B:
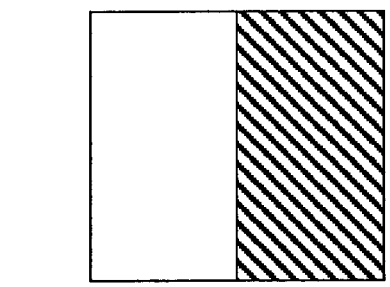
Figure 2A:
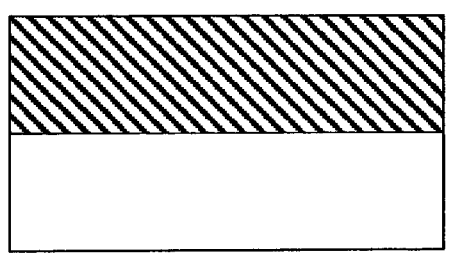
Figure 2F:
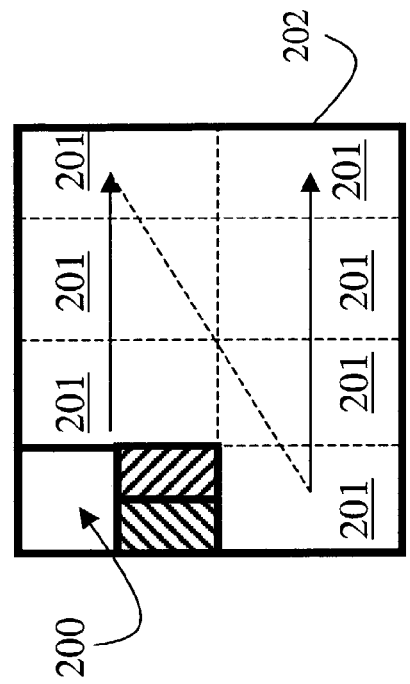
Figure 2E:
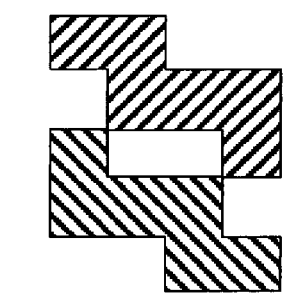

FIG. 2F shows a rectangle filter 200 relative to the enclosing detection windows 201, eight in this example combined image 202. It should be noted that tens of thousands other simple configurations of rectangle filters can be used. The filters can be of various sizes to match the sizes of the detection windows. For two rectangle filters, the sum of intensities of the pixels within the unshaded rectangle is subtracted from the sum of the intensity of the pixels in the shaded rectangle. For three-rectangle filters, the sum of pixels in unshaded rectangle is multiplied by two to account for twice as many shaded pixels, and so forth. Other combinatorial functions can also be used with the filters according to the invention. We prefer simple operations for our filters because they are very fast to evaluate, when compared with more complex filters of the prior art.

Viola et al. use the rectangle filters for detecting static faces in a single image. We extend their work in two ways. First, we also use a rectangle filter that has its internal components arranged diagonally, see FIG. 2E. Diagonal filter, as an advantage, are suited to detect pendulum like leg movement. In addition, diagonal filter are sensitive to objects at various orientations. The angle of the diagonal can be controlled by the aspect ratios of the component rectangles within the filter. Second, we apply the filters to combinations of temporally displaced image, as described below. Depending on their design, these rectangle filters can be evaluated extremely rapidly at various scales, orientations, and aspect ratios to measure region averages. Although these filters may appear to be somewhat limited, it can be demonstrated that they provide useful information that can be boosted to perform accurate detection of specific moving objects, such as pedestrians.

Formally, operations with our filters, features and classifiers are defined as follows, see Viola et al. for additional details. An image feature $h_i(x)$ is assigned a weight $\alpha_j$ or $\beta_j$ according to $$h_j(x) = \begin{cases} \alpha_j & \text{if } f_j(x) > \theta_j \\ \beta_j & \text{otherwise} \end{cases},$$

where a filter $f_j(x)$ is a linear function of an otherwise image x, i.e., a detection window, and $\theta_j$ is a predetermined filter threshold value. An cumulative sum C(x) is assigned a value 1 or 0 according to $$C(x) = \begin{cases} 1 & \text{if } \sum_j h_j(x) > T \\ 0 & \text{otherwise} \end{cases},$$

where $h_j$ are multiple features of the image x, and T is a predetermined classifier threshold. Definitions that concurrently consider appearance and motion are described below.

In the prior art, motion information has been extracted from pairs of images in various ways, including optical flow and block motion estimation. Block motion estimation requires the specification of a comparison window, which determines the scale of the estimate. This is not entirely compatible with multi-scale object detection. In the context of object detection, optical flow estimation is typically quite time consuming, requiring hundreds or thousands of operations per pixel. We desire something faster.

Although this invention has been described using rectangle filters to determine feature values for the classifier, it should be understood, that other types of filters could be used. For example, other linear or non-linear filters, such as Gabor filters or Gaussian filters can be in place of rectangle filters. The advantage of rectangle filters is that they are extremely computationally efficient to evaluate. However, other types of filters can possibly capture more complicated motion and appearance information, and may be advantageous for that reason, see Daugman, "Uncertainty Relation for Resolution in Space, Spatial Frequency, and Orientation Optimized by Two-Dimensional Visual Cortical Filters," J. Opt. Soc. Am. A, vol 2, no 7, pp. 1160–1169, July 1985.

Combined Images

Therefore, as shown in FIGS. 3A–3H, our features, unlike those of Viola et al., operate on the sets of combined images 121. The sets of combined images can be determined by applying various functions 102 to the selected images 111. For example, the selected set of images includes pairs of consecutive images—disjoint or overlapping. Alternatively, the set can include every tenth image over a predetermined period of time, or the set can include triplets of images. Other combinations and temporal orderings are also possible in the selected images 111.

A function 102, when applied to the selected images 111, generates a "combined" image. For example, the function can simply select one image of the set, FIG. 3A. The function can subtract the selected images in the set from each other. In this case, the combined image is what is known as a difference or delta image, FIG. 3B. Regions in the combined image where the sum of the absolute values of the difference is non-zero, e.g., along object edges, correspond to motion. The magnitude and direction of motion can also be determined as described below.

The direction of motion can be determined by applying other functions 102 to the selected images 111. For example, the function can "shift" the images in the set, before taking the difference. The shifting can be linear, rotational, scale, or combinations thereof, to detect, for example, linear motion substantially in the plane of the images, circular motion, or motion substantially perpendicular to the plane of the images. FIGS. 3C and 3D show up (U) and (D) shifted images, FIGS. 3E and 3F show left (L) and right (R) shifted images, FIG. 3F shows rotated (®) images, and FIG. 3H shows shifting in scale (s). This group of functions can be represented by:

a. $I = I_t, I_{t+1}$
$\Delta = abs(I_t - I_{t+1})$,
$U = abs(I_t, I_{t+1} \uparrow)$,
$D = abs(I_t - I_{t+1} \downarrow)$,
$L = abs(I_t - I_{t+1} \leftarrow)$,
$R = abs(I_t - I_{t+1} \rightarrow)$,
$C = abs(I_t - I_{t+1} ®)$,
$s = abs(I_t - I_{t+1} S)$, where $I_t$ and $I_{t+1}$ are images in time, and the arrows indicate linear shift operators, ® is rotation, and s indicates scaling. The shift can be one or more pixels. It should be noted that other differences, and other shift operations are possible, although the above examples are simple and quick to compute for our purposes.

One motion feature compares sums of absolute differences between the difference image $\Delta$, and one or more of the shifted images of the group $\{U, L, R, D, ®, s\}$ according to $f_i = r_i(\Delta) - r_i(S)$, where S is one of $\{U, L, R, D, ®, s\}$, and $r_i$ is a sum within the detection window. These features extract information related to the likelihood that a particular region is moving in a given direction.

Another motion feature compares sums within the same image according to $f_j = \phi_j(S)$, where $\phi_j$ is a filter like the examples shown in FIGS. 1A–1G. These features approximately measure motion shear.

Another motion feature measures the magnitude of motion in one of the motion images as: $f_k = r_k(S)$.

The magnitude of motion can also be determined by the temporal difference between the images in the set.

We also use appearance features, which use filters that operate on a single image in the set: $f_m = \phi(I_t)$.

It should be noted, that once a moving object has been detected in some region of an image, then it becomes possible to track the object in subsequent images to get a better understanding of the magnitude and direction of motion. Because the location of the moving object is known, only a small part of the subsequent images need to be evaluated, which can be performed at a much faster frame rate.

The motion features as well as the appearance features can be evaluated rapidly using an "integral image" of the functions $\{I_t, \Delta, U, D, L, R, ®, s\}$. Because the filters can have any size, aspect ratio, or orientation, as long as they fit in the detection window, there are very many possible motion and appearance features. The filters can also be scaled to various sizes. These can be stored in a cache for fast processing. During training, the feature that best separate positive examples from negative examples is selected.

The motion feature 131 $F_j$ is $F_j(I_t, I_{t+1})$ part of item # 0131

$$F_j(I_t, I_{t+1}) = \begin{cases} \alpha_j & \text{if } f_j(\Delta, U, D, L, R, ®, s) > t_j \\ \beta_j & \text{otherwise} \end{cases},$$

$$= \begin{cases} 1 & \text{if } \sum_{i=1}^{N} F_j(I_t, \Delta, U, D, L, R, ®, s) > 0 \\ 0 & \text{otherwise} \end{cases}.$$

and the cumulative score 141 is $C(I_t, I_t + 1)$

Image Pyramids

In order to support detection at multiple scales, the functions 102 $\{\uparrow, \downarrow, \leftarrow, \rightarrow, ®, s\}$ are defined with respect to the detection scale. This ensures that measurements of motion velocity are made in a scale invariant way. Scale invariance is achieved during training by scaling the training images to a base resolution of 20 by 15 pixels. The scale invariance of the detection is achieved by operating on image pyramids. Initially, the pyramids of $I_t$ and $I_{t+1}$ are computed. Pyramid representations of $\{\Delta, U, D, L, R, ®), S\}$ are computed as:

$\Delta^l = abs(I^l_t - I^l_t + 1)$,
$U^l = abs(I^l_t - I^l_t + 1 \uparrow)$,
$D^l = abs(I^l_t - I^l_t + 1 \downarrow)$,
$L^l = abs(I^l_t - I^l_t + 1 \leftarrow)$,
$R^l = abs(I^l_t - I^l_t + 1 \rightarrow)$,
$®^l = abs(I^l_t - I^l_t + 1 ®)$, and
$s^l = abs(I^l_t - I^l_t + 1 s)$, where $X^l$ refers to the $l^{th}$ level of the pyramid. Classifiers and features, which are learned from scaled 20 by 15 training images, operate on each level of the pyramid in a scale invariant fashion.

Training

The training process uses Adaboost to select a subset of features and construct the classifiers. Adaboost provides an effective learning algorithm and strong bounds on generalized performance, see Freund et al., "A decision-theoretic generalization of on-line learning and an application to boosting," *Computational Learning Theory*, Eurocolt '95, pages 23–37. Springer-Verlag, 1995, Schapire et al., "Boosting the margin: A new explanation for the effectiveness of voting methods," *Proceedings of the Fourteenth International Conference on Machine Learning*, 1997, and Tieu et al., "Boosting image retrieval," *International Conference on Computer Vision*, 2000.

EFFECT OF THE INVENTION

The invention provides a method for detecting moving objects in a video sequence. The method uses rectangular filters that are scanned over combined image to determine features of the combined images. The features are summed to detect particular moving objects, such as pedestrians.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for detecting a moving object in a temporal sequence of images of a video, comprising:

selecting images from the temporally ordered sequence of images;

applying a set of functions to the selected images to generate a set of combined images;

evaluating a linear combination of filters on a detection window in the set of combined images to determine motion and appearance features of the detection window, in which the filters are two-dimensional;

summing the motion and appearance features to determine a cumulative score; and classifying the detection window as including the moving object when the cumulative score is greater than a predetermined threshold.

2. The method of claim 1 wherein the moving object is a pedestrian.

3. The method of claim 1 wherein the selected images are an adjacent pair of images.

4. The method of claim 1 wherein the selecting, applying, evaluating, summing and classifying is repeated for the entire video.

5. The method of claim 1 further comprising:
partitioning each combined image into a set of detection windows; and
repeating the evaluating, summing, and classifying for each detection window.

6. The method of claim 1 wherein internal components of a particular filter are rectangular and arranged on a diagonal.

7. The method of claim 6 wherein each rectangle filter is sized to match the associated detection window.

8. The method of claim 1 wherein a particular feature $h_j$ is evaluated to a weight $\alpha_j$ or $\beta_j$ according to $$h_j(x) = \begin{cases} \alpha_j & \text{if } f_j(x) > \theta_j \\ \beta_j & \text{otherwise} \end{cases},$$

where a particular filter fj(x) is a linear function of the detection window x, and θj is a predetermined filter threshold value.

9. The method of claim 8 wherein a particular cumulative sum C(x) is assigned a value 1 or 0 according to $$C(x) = \begin{cases} 1 & \text{if } \sum_j h_j(x) > T \\ 0 & \text{otherwise} \end{cases},$$

where $h_j$ are multiple evaluated features of the detection window x, and T is the predetermined classifier threshold.

10. The method of claim 1 wherein a particular combined image is a difference of the selected images.

11. The method of claim 1 wherein a particular combined image is a difference of shifted selected images.

12. The method of claim 11 wherein the shifting is linear.

13. The method of claim 11 wherein the shifting is rotational.

14. The method of claim 11 wherein the shifting is in scale.

15. The method of claim 1 wherein the set of functions are defined with respect to a scale of the detection window.

16. The method of claim 1 further comprising:
determining a direction of motion of the moving object.

17. The method of claim 1 further comprising:
determining a magnitude of motion of the moving object.

18. The method of claim 1 wherein the filter is a rectangular filter.

19. The method of claim 1 wherein the filter is non-linear.

* * * * *